Aug. 1, 1944.   C. R. CARPENTER   2,354,848
FISH STRINGER AND THE LIKE
Filed Sept. 27, 1941

Inventor
Charles R. Carpenter
By Peck & Peck
Attorneys

Patented Aug. 1, 1944

2,354,848

UNITED STATES PATENT OFFICE 2,354,848

FISH STRINGER AND THE LIKE

Charles R. Carpenter, Robbinsdale, Minn.

Application September 27, 1941, Serial No. 412,649

10 Claims. (Cl. 24—161)

This invention relates to fish stringers and the like; and the objects and nature of the invention will be made clear to those skilled in the art by the following description of the accompanying drawing that discloses mechanical expressions or example embodiments of the invention from among other forms and modifications within the spirit and scope of the invention.

It is often desirable to provide a fish stringer that can be attached at one end to a boat or dock, etc., so that the depending free end of the stringer provided with one or more fish retainers, can hang in the water, for the purpose of keeping the captive fish alive and fresh.

It is difficult, however, with the prior fish retaining devices heretofore in use, so far as now known to me, to maintain the captive fish securely locked against accidental release, while permitting the captive fish to breathe naturally through the gills while the jaws are substantially closed together.

It is an object of this invention to provide certain improvements in fish retainers for such stringers, that will overcome such difficulties, and that will constitute an automatic or self-locking snap or hook, of a formation to permit the captive fish to breathe in a natural manner, yet will positively retain the fish against accidental release, while requiring peculiar manual manipulation for release of the hook and separation of the fish therefrom.

A further object of the invention is to provide a retaining hook or the like that includes a free-end bill located substantially in the plane of the longitudinal axis of the hook shank or body, and under constant tension to maintain and return to its normal hook-opening position, with improved automatic self-locking or snap keeper means for securing said bill in its hook-closing position, and capable of releasing said bill by peculiar manual manipulation.

With the foregoing objects in view, and others that will be apparent from the following description, my invention consists in certain novel structural features, arrangements, and combinations, as hereinafter more fully explained, and specified by the appended claims.

Referring to the accompanying drawing, forming a part hereof:

Fig. 6 is a side elevation of the structure of Fig. 1, showing a hand and a finger of the other hand in the operation of releasing the hook bill; dotted lines show the hook bill pressed inwardly against the shank to clear the keeper and its leg that has a slight slant or inclination to clear weeds and the like.

Figure 1:
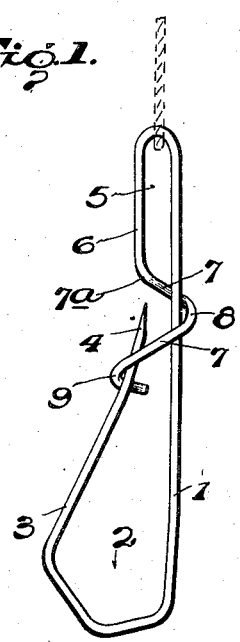
Fig. 1 is a side elevation of an example embodiment of the invention, with the hook bill locked in closed position.
Figure 2:
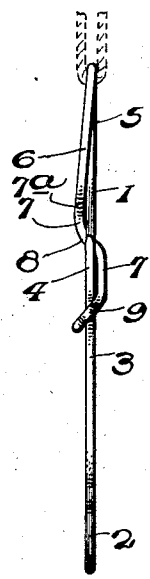
Fig. 2 is an edge elevation of the structure of Fig. 1.
Figure 3:
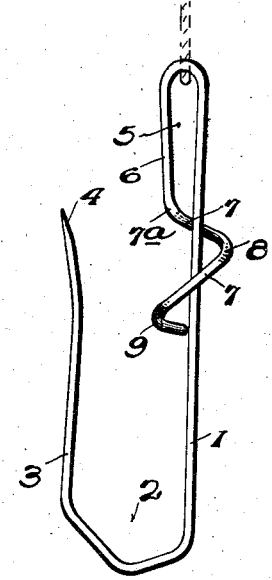
Fig. 3 is a side elevation of the structure of Fig. 1, with the hook bill released and the hook open for removal of a fish therefrom or application of a fish thereto.

The embodiment of Fig. 1, comprises a strong stiff resilient rod or wire, the elongated substantially-straight intermediate portion of the length of which, forms the stem or shank 1, of the hook 2, provided with an elongated upstanding hook bill 3, the free end 4, of which is pointed for puncturing, and threading through, for instance, both jaws of a captive fish, for retaining the fish on the hook while permitting the fish to keep its mouth closed to permit natural breathing through its gills.

The formation of the return bend of the resilient rod between the lower end of the shank 1, and the substantially straight puncturing or needle-like long bill 3, is such that said bill is constantly under tension to remain in and to spring laterally back to its normal position remote from shank 1, with the hook open for removal of a fish, or to permit said bill to be threaded through the jaws of a fish, preparatory to locking the same in the hook.

In order to close and lock the hook, the bill must by substantially strong pressure of the hand or fingers, be swung or bent laterally against the opposing spring pressure thereof, from its opened position, toward the upper portion of the shank 1, until the pointed end 4, of said bill laterally, or almost laterally contacts said shank, for locking by means hereinafter described.

It is a characteristic of this invention, that the bill end 4, is under spring tension to move toward and from the hook shank 1, substantially in the plane of the longitudinal axis of said shank, and against sidewise movement from said plane except when being locked and released. If said bill end is pressed sidewise from its said normal plane, it is under tension to spring back again into said plane.

The upper end of the shank 1, is provided with a spring loop 5, that controls the lock or keeper for the bill 3, 4, of the hook; and that also, if necessary, provides an eye or loop by which the supporting line, cable, or the like of the fish stringer is secured to the hook.

In the particular embodiments illustrated, this upper flat loop 5, is located in the same longitudinal plane as the hook 2, 3, 4, and the longitudinal axis of the shank 1, and said loop 5, and hook 3, are arranged longitudinally of shank 1, and along the same side of the longitudinal axis of said shank, although I do not wish to thus strictly limit all features of my invention.

The spring or resilient loop 5, is of substantially U-shape formation, and includes a preferably downwardly extended return-bend laterally-springable free end leg 6, arranged longitudinally of and laterally spaced from shank 1. This spring arm 6, at its free end, carries and controls the hook bill keeper and lock 7, 8, 9. Said keeper and lock is formed by providing the free end of arm 6, with a transversely offset or inwardly-directed rigid substantially V or U-shaped bend or yoke 7, that straddles and extends across the shank 1, of the hook, and provides a return bend 8, to cross the hook shank 1, and form a stop laterally engaging said shank to limit the lateral or transverse movement of said angular bend 7 in one direction.

The extremity of the free end of this laterally movable spring-pressed arm 6, is provided with a transversely arranged substantially hook U or V-shaped keeper 9, 10, open toward the shank 1, and arranged on the opposite side thereof than the return bend 8, of the offset angular or U-bend 7. In fact, this keeper 9, 10, is rigid with the lower end leg of the bend 7. This keeper 9, is arranged to straddle the hook bill 4, from the outer side thereof, to hold and lock said bill in hook closing position. The keeper includes a depending rigid outer leg 10, directed toward the shank 1, to cooperate with said shank in preventing sidewise deflection of the hook bill past said leg when the keeper and hook bill are held close to the shank. The offset angular portion 7, 8, of the laterally movable spring pressed arm, that more or less closely and slidably fits the opposite sides of the shank, maintains said arm 6, and the keeper 9, 10, carried thereby from sidewise deflection or movements substantially out of the plane of the longitudinal axis of the shank, while the opposite side legs of the keeper 9, 10, hold the hook bill when locked in closed position against sidewise movements from said plane of the shank 1.

The hook bill 4, when locked to the shank 1, by keeper 9, is under strong spring tension, to swing laterally from said shank, to its normal position opening the hook, and said hook bill must be forced laterally against said spring tension, to its hook closing position in which it is locked by said keeper. When the hook bill 4, is in this locked position, the point of bill 4, approximately engages the adjacent side of shank 1, and is in the plane of the longitudinal axis of said shank. In fact, by preference, the path of movements of the hook bill toward and from shank 1, is located in said plane of the longitudinal axis of the shank, and so long as the point 4, of the hook bill is engaged within keeper 9, said point is held against sidewise deflection from said plane, and is guarded against release from the keeper by an adjacent keeper-guarding length of said shank or stem.

The lock and keeper 9, carried and controlled by the spring leg 6, of loop 5, is held by its V-shaped angle or bend 7, that straddles shank 1, from sidewise deflection with respect to shank 1, and hence is also confined to movements toward and from shank 1, substantially in said plane of the longitudinal axis of said shank.

The leg 6, of the loop 5, is constantly under spring tension tending to move the lock and keeper 7, 9, transversely of the shank 1, to a position where the U-shaped keeper 9, almost or approximately straddles the shank 1, as when the hook bill is in its normal outward position with the hook open. In other words, the keeper 9, and its lock, are under tension, when locking the hook bill, to swing in the opposite direction, than the direction in which the hook bill swings when released.

Thus, when the hook bill is held in hook closing position by the keeper 9, the open side of the U-shaped keeper faces toward and is directly opposite shank 1, so that the point 4, of the bill is straddled by said keeper, and is thereby held against sidewise deflection therefrom. The power of the lateral or outward spring tension then acting on the hook bill, is sufficient to approximately overbalance the spring tension acting in the opposite direction on the leg 6, and the keeper through angle 7. Hence, the keeper 9, will follow inward movement of the hook bill 4, toward the shank, and thus prevent right-angle sidewise movement of the hook bill end in a direction to clear the same from the leg 10, of said keeper, as direct inward releasing movement of the hook bill from the keeper is prevented by approximate engagement of the hook bill with the adjacent side of the hook shank 1, while sidewise release of the hook bill is then blocked by the proximity of the keeper leg 10, to said shank. Thus, this spring action of the keeper 9, in following the point 4, of the hook, should the point 4, be accidentally or otherwise pressed and moved toward the shank, prevents accidental sidewise release thereof from the keeper. This following spring action of the keeper maintains the operative engagement of the keeper with the bill point, against accidental or other relative sidewise movements of the bill point capable of releasing the bill point from the keeper, before the keeper moves close enough to the shank to block such sidewise bill point movements.

Under this embodiment, to release the bill of the hook, and permit the same to automatically move to its hook opening position, inward pressure should be applied to move the hook point in a direction toward the shank and away from the keeper 9, while simultaneous pressure should be applied to the leg 6, or to bend 8, thereof in the opposite direction, to stop the inward following movement of the keeper.

When the keeper 9, is thus held against its spring pressure, to stop the keeper a sufficient distance from the shank 1, the bill point 4, can be moved relatively of the keeper, toward shank 1, to clear the keeper 9, and then be pressed sidewise free of the keeper, and allowed to spring to its normal hook opening position, so that a fish can be removed therefrom, or a fish can be threaded thereon, preparatory to closing and locking the hook.

To again close the hook and lock the hook bill, the opened hook bill can be pressed toward the shank 1, while pressure is applied in the opposite direction to the angle bend 8, of the leg 6, to move the keeper 9, in a direction toward the advancing hook bill and away from the shank 1, until space is afforded between the shank 1, and the leg 10, of the keeper 9, for the inwardly advancing hook bill to slip past the keeper, by sidewise yielding, to a position between the shank 1, and the open side of the keeper, whereupon the hook bill can be allowed to move outwardly into retained locking engagement with the keeper. The outward spring pressure of the hook bill on the keeper will then bring the parts to the locked position, as shown by Fig. 1.

Figure 4:
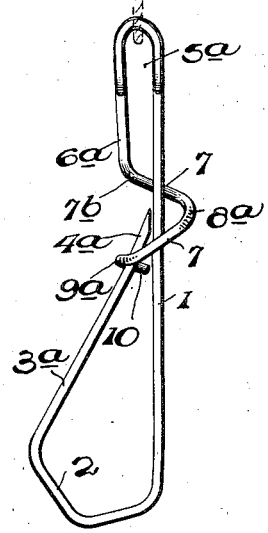
Fig. 4 is a side elevation of another embodiment of the invention.
Figure 5:
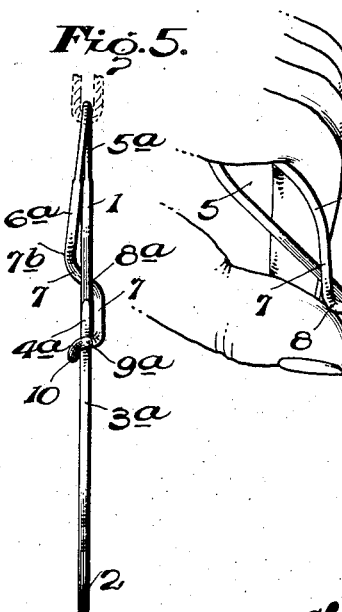
Fig. 5 shows the structure of Fig. 4 in edge elevation.
Figure 6:
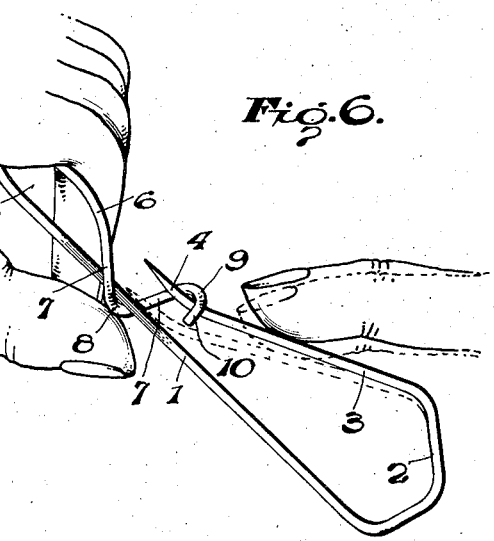

The organization disclosed by Fig. 4, is substantially the same as that disclosed by Fig. 1, with the exception that the spring power of the leg 6a, of the loop 5a, is relatively greater than that of the leg 6, and loop 5, of Fig. 1, with respect to the opposing spring power of the hook bill 3a, 4a, so that the point 4a, of the hook bill will be held almost if not directly against the side surface of the hook shank 1, and be thereby guarded against picking up weeds and/or other water vegetation, when drawn through the water.

The bulge 7b, of the leg 6a, immediately above or in advance of the locked hook bill point also serves as a weed guard.

Also, in the form shown by Fig. 1, the bulge 7a, immediately above the point 4, of the locked hook bill serves as a guard to deflect weeds, etc., from catching and collecting on the hook bill point.

The embodiment Fig. 4, as illustrated, is substantially the same as the embodiment shown by Fig. 1, with the exception of the increased spring power applied to laterally move the keeper carrying leg 6a, with respect to the spring power applied to the long hook bill tending to move said bill in opposition to the spring tension acting on said keeper-carrying leg 6a.

The locked hook bill of the embodiment of Fig. 4, can be released, to open the hook, by pressing the hook bill inwardly toward the shank 1, while exerting pressure in the opposite direction on the exterior of return bend 8a, to move said leg 6a, and its keeper 9a, laterally until the inner side of bend 8a, approximately engages the shank 1, and the keeper 9a, has moved outwardly from the shank and from the hook bill, a sufficient lateral distance to permit the hook bill to be pressed sideways and clear the slanted leg 10, of the keeper, whereupon the hook bill when released, will spring back to its normal hook opening position.

The opened hook of Fig. 4 can be closed and locked, by pressing the spring leg 6a, laterally toward the shank 1, by exterior pressure applied to 8a until the lateral movement of said leg is substantially stopped by engagement of bend 8a, with the shank 1, and while thus holding said leg 6a, pressing the hook bill inwardly toward the shank, until its end slips inwardly past leg 10, of the keeper, and snaps outwardly into the open side of said keeper, which then straddles and locks said bill in hook closing position.

While certain embodiments of the invention have been disclosed, it is to be understood that the inventive concept may be reduced to various other mechanical embodiments, within the spirit and scope of the appended claims, and hence the foregoing explanations and disclosures are made merely for the purpose of explaining the structure and operations of the disclosed embodiments.

What I claim is:

1. A hook comprising a stem providing a longitudinal keeper guarding portion; resilient loops joined by said stem; one of said loops providing a hook having a free-end hook bill under spring urge to move substantially in a longitudinal plane of said stem portion in a direction away from said portion, the movement of said bill in the opposite direction being limited by said guarding portion of the stem; the other loop including a free end leg provided with a hook-bill keeper for straddling said hook bill, said keeper being open at its side facing said stem portion, said keeper being maintained by said leg in substantially said longitudinal plane of said stem portion, said leg and its keeper being under spring urge to move laterally toward said stem portion; means being provided for the reception of temporarily applied force to said leg to move said keeper in a direction laterally from its normal position guarded by said stem portion, for release of said hook bill from said keeper with respect to said stem portion.

2. A hook comprising a stem; resilient loops joined by said stem, both substantially located on the same side of the stem and in a longitudinal plane substantially common to both loops and the stem; one of said loops providing a free-end hook bill under tension to move toward hook-opening position; the other loop providing a free end leg that includes a substantially U-shaped keeper for said hook bill, said leg and its keeper being under tension to move toward an intermediate portion of the length of said stem to yieldingly maintain said keeper and the hook bill restrained thereby in position guarded by said stem portion, the open side of said keeper facing said stem portion; said leg providing an offset loop-like portion straddling said stem and loosely guided thereby and providing an abutment for the reception of pressure to limit the normal movement of said leg and its keeper toward said stem, for the purposes, substantially as described.

3. An article for the purposes, substantially as described, comprising a longitudinal stem providing a hook with the free end of its bill under spring tension to move to hook-opening position substantially in a longitudinal plane of said stem; said stem also providing a longitudinally arranged free end leg provided with a hook-bill keeper under spring tension to move said keeper substantially in said longitudinal plane toward and to yieldingly maintain the same in normal position, guarded by a longitudinal portion of said stem; said leg providing a portion loosely and slidably embracing an intermediate portion of said stem, whereby said hook bill can be inserted in and released from said keeper by simultaneous manipulation of said leg and said hook bill.

4. A hook comprising a longitudinal stem and a free end hook bill under tension to move laterally from said stem toward hook-opening position with respect to said stem; and keeper means for yieldingly restraining said bill with its free end in a longitudinal plane of said stem and in hook closing position guarded by an intermediate length of said stem, said means including a leg carried by said stem and provided with a forked keeper for straddling the free end of said hook bill, the open side of said keeper facing said stem and located in said longitudinal plane thereof, said leg and the keeper carried thereby being under tension to yieldingly maintain said keeper and the free end of the hook bill restrained thereby in hook closing position guarded by said stem, for the purposes substantially as described.

5. A fish stringer comprising a longitudinal stem including a keeper-guarding portion of its length; said stem having a resilient return bend forming a hook and its free-end bill, said bill free end being located in a longitudinal plane of said keeper-guarding portion of the stem and under spring tension to move laterally in one direction;

said stem being also provided with a substantially longitudinal free-end leg under spring tension to move laterally in the opposite direction than said hook bill, said leg at its free-end portion provided with a keeper restrained to move in said longitudinal plane toward and from said stem portion, said keeper normally straddling and holding said bill end toward said stem portion with said stem portion guarding said bill against forceful accidental release from said keeper, said keeper having an open side facing said stem portion for the lateral reception and release of said hook bill end when forcibly restrained toward said stem portion while said keeper is restrained in an abnormal position remote from said stem portion, whereby when the tension on said hook bill while embraced by said keeper, is relieved by pressure toward said shank, the tension on the keeper will move the same toward said stem portion with said hook bill, and said stem portion will prevent disengagement of the hook bill from the keeper.

6. A fish stringer comprising a longitudinal stem having opposite end resilient return bends, one resilient bend being in the form of a hook with its bill spring-pressed toward its normal position, the other resilient bend providing a leg spring-pressed in the opposite direction toward its normal position, said leg at its free-end portion forming a hook-like keeper for receiving said bill and restraining the same in hook closing position toward and guarded by said stem, said bill and said keeper being located on the same side of said stem in substantially the same plane longitudinally of said stem.

7. The fish stringer called for by claim 6, when said leg is formed with an offset portion looped around said stem and provided with an abutment at the opposite side of said stem from that on which said keeper is located.

8. The fish stringer called for by claim 6, when the spring tension of said bill element is in one lateral direction and the spring tension of said leg element is in the opposite lateral direction, with the spring tension of one element exceeding the spring tension of the other element.

9. The fish stringer called for by claim 6, when the spring tension urging the hook bill in a direction laterally from the stem is less than the spring tension urging the keeper and the bill restrained thereby toward said stem.

10. The fish stringer called for by claim 6, when the spring tension urging the hook bill toward hook opening position is greater than the spring tension urging the keeper and the bill restrained thereby toward the same and hook closing position.

CHARLES R. CARPENTER.